H. H. M. KAMMERHOFF.
GALVANIC BATTERY.
APPLICATION FILED AUG. 6, 1917.

1,255,536.

Patented Feb. 5, 1918.

Witnesses:

Inventor:
Heinrich H. Meno Kammerhoff
By Delos Holden

UNITED STATES PATENT OFFICE.

HEINRICH H. MENO KAMMERHOFF, OF ORANGE, NEW JERSEY, ASSIGNOR TO EDISON STORAGE BATTERY COMPANY, OF WEST ORANGE, NEW JERSEY, A CORPORATION OF NEW JERSEY.

GALVANIC BATTERY.

1,255,536.  Specification of Letters Patent.  Patented Feb. 5, 1918.

Original application filed February 9, 1914, Serial No. 817,493. Divided and this application filed August 6, 1917. Serial No. 184,686.

*To all whom it may concern:*

Be it known that I, HEINRICH H. MENO KAMMERHOFF, a subject of the Emperor of Germany, and a resident of Orange, Essex county, New Jersey, have invented certain new and useful Improvements in Galvanic Batteries, of which the following is a description.

This application is a division of my co-pending application Serial No. 817,493, filed February 9, 1914, and entitled Galvanic batteries.

My invention relates to galvanic batteries and more particularly to an improved arrangement whereby the necessity of insulating from each other the conducting containers of a pair of storage battery cells comprising a battery is obviated.

It has been usual in batteries consisting of a pair of cells connected in series and having metallic containers, to maintain the containers insulated from each other and from the battery elements. In such batteries the insulation between the containers is liable to be weakened or destroyed, thereby permitting current to flow in such paths through the cells as to cause electrolytic action at the interior of the containers. One of the objects of my invention is to dispense with the insulation previously used between the cells of such batteries or to employ a two-compartment metallic container and to provide means for preventing electrolytic action of the aforesaid character. I secure this result by connecting together electrically a positive pole of one cell, a negative pole of the other cell and the containers (where two containers are used) or the container (where a two-compartment container is used), thereby maintaining said poles and containers or container at substantially the same potential, and insuring that all electrolytic action shall take place between the elements of the cell. I am thereby enabled to increase materially the efficiency and longevity of the battery.

In order that my invention may be more clearly understood, attention is directed to the drawing accompanying and forming a part of this specification, and in which:

Fig. 3 is a fragmentary view similar to Fig. 2 showing a two-compartment container, in the compartments of which the elements of a pair of cells are respectively disposed.

Figure 2:
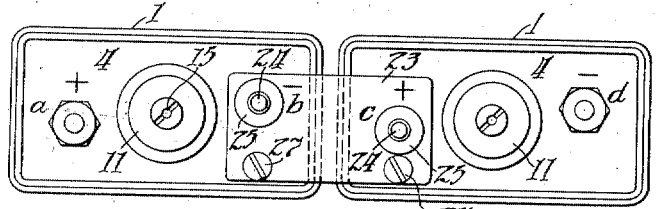
Fig. 2 is a plan view of the battery shown in Fig. 1.
Figure 1:
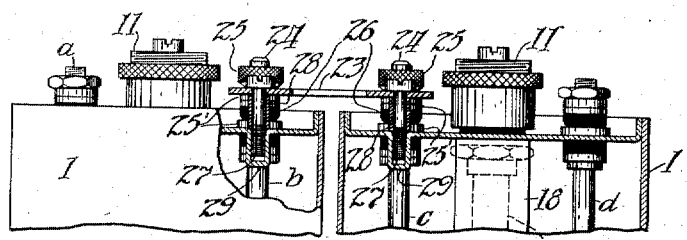
Figure 1 is a side elevation, partly in section, of the upper ends of a pair of cells comprising a battery and arranged and connected in accordance with my invention.
Figure 2:
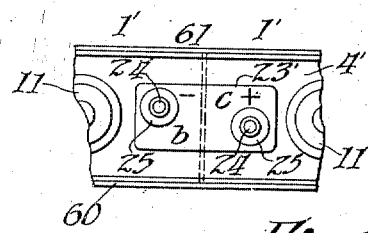

Referring to the drawing and especially to Figs. 1 and 2, reference characters 1, 1 represent the metallic containers of a pair of storage battery cells comprising a battery, in each of which containers a plurality of alternately arranged positive and negative elements or plates (not shown) are disposed, the materials utilized in each of the cells and the general arrangement of the parts of each cell preferably being the same as described in Patent No. 1,073,107, granted September 16, 1913 to Thomas A. Edison. Reference characters 11, 11 represent the caps of a pair of vent tubes respectively secured to the tops 4, 4 of the containers 1, 1 and extending into the latter, one of these vent tubes being indicated in Fig. 1 by reference character 5. The vent tubes are respectively positioned by bracing members, one of which is shown at 18 in Fig. 1. Reference characters $a$ and $b$ represent the positive and negative poles respectively of one of the cells, which poles extend through the top 4 of the cell and are suitably insulated therefrom, and which are respectively connected within the container to the positive and negative elements of the cell; while reference characters $c$ and $d$ respectively represent the positive and negative poles of the other cell which extend through and are properly insulated from the top 4 of the latter and are respectively connected to the positive and negative elements or plates within the cell.

The two cells are connected in series by means of a plate 23 of low resistance, which plate connects the pole of one polarity in one of the cells with the pole of opposite polarity in the other cell by means of the terminal binding posts 24 which are drawn into tight engagement with the plate by means of the nuts 25 and washers 25′ compressing the interposed resilient washers 26 which act to hold the nuts 25 from unthreading and need not be of insulating material. This plate is also electrically connected to the metallic containers 1, and for this purpose screws 27 extend through the plate and respectively into engagement with the tops or heads 4 of the containers, and preferably into screw-threaded engagement with depressed sockets 29 forming parts of the heads. The screws 27 each extends through a spacing sleeve 28 disposed between the plate 23 and the respective head 4, whereby the plate is maintained in proper position, and twisting or bending of the same, when the binding posts are screwed down on the plate, is prevented.

While the device has been described particularly with relation to two independent cells, it is obvious that when the sides of the cells are brought into physical contact without insulation therebetween, the two casings become in effect a single casing with a dividing partition, or a two-compartment container.

Assuming that the battery is being charged, and that the poles $a$, $b$, $c$ and $d$ (Fig. 2) are alternately positive and negative in order as indicated, then the current will travel from the positive terminal or pole $a$, through the electrolyte to the negative pole $b$, through the plate 23 to the positive pole $c$, and through the electrolyte in the second container or compartment to the negative terminal pole $d$. When so arranged, should the containers be in electric contact, the current after traversing through the electrolyte in the first compartment, will pass to the pole $b$ disposed in its path rather than travel around this pole to the side of the container, which has the same polarity as the pole, for the electrolyte disposed between the pole $b$ and the adjacent side of the container offers a material resistance to the passage of the current. As the sides of the second container have the same potential as the pole $c$, there will be no tendency for the current to travel through the contacting sides to this pole. There will thus be eliminated any electrolytic decomposition of the containers which might result from a portion of the current traveling from the sides of the containers to the poles when the containers are in electric contact with each other. Should the battery, as a storage battery, be discharging then, the direction of flow of the current will be reversed and current will flow from the positive pole $a$ of the battery.

Thus, by connecting the metallic containers 1 electrically with a positive pole of one cell and a negative pole of the other cell, these poles and the containers are maintained substantially at the same potential and the current, following the path of least resistance, passes through all the poles in the usual order of cells connected in series rather than through the sides of the containers and the portions of the electrolyte adjacent thereto.

Fig. 3 illustrates a two-compartment container which may be employed instead of the separate containers shown in Figs. 1 and 2, and with which the same results may be obtained as described above. Referring to this figure, reference character 60 represents the container which is provided with a central vertical partition 61, dividing the container into two compartments 1', 1'. Reference characters $b$ and $c$ represent the adjacent poles of unlike polarity of the battery elements which are respectively disposed in the compartments 1', 1'. The binding post 24 of each of the poles $b$ and $c$ is preferably directly grounded to the container top 4', and the elements 27, 28 and 29 employed in the construction shown in Figs. 1 and 2, are preferably dispensed with. The cells in the two compartments 1', 1' are connected in series by means of a plate 23' of low resistance which is secured to the binding posts 24, 24 of the poles $b$ and $c$ by means of the nuts 25.

While I have described and shown a preferred embodiment of my invention, many changes may be made therein without departing from the spirit thereof, and I do not, therefore, wish to be limited to the specific structure shown and described.

Having now fully described my invention, what I claim as new and desire to protect by Letters Patent of the United States is as follows:—

1. In a galvanic battery, a two-compartment conducting container the walls of which are inactive to the electrolyte of the battery, each compartment having battery elements therein, and means for maintaining said container and a battery element in each compartment at substantially the same potential, substantially as described.

2. In combination, a pair of galvanic cells having containing means of conducting material inactive to the electrolyte of the battery, and means for connecting together electrically a positive pole of one cell, a negative pole of the other cell and said containing means, substantially as described.

3. A galvanic battery comprising a pair of cells having conducting containing means and having a positive pole of one cell and a negative pole of the other cell in electrical connection with said containing means, substantially as described.

4. The combination of metallic containing means for galvanic batteries comprising a pair of compartments, said containing means being inactive to the electrolyte, galvanic battery elements within each of said compartments and a conducting plate connecting the walls of said compartments with certain of the battery elements in each compartment substantially as described.

5. The combination with metallic containing means for galvanic batteries comprising a pair of compartments each having galvanic battery elements therein, of a conducting member electrically connecting the walls of said compartments, said conducting member also being electrically connected with a pair of battery poles of opposite polarity relatively disposed in said compartments, substantially as described.

6. In a battery, a two-compartment conducting container, each compartment having battery elements therein, and means for electrically connecting the container with a pole of one polarity in one compartment and with the pole of opposite polarity in the other compartment, substantially as described.

7. A storage battery unit comprising conducting containing means having provision for forming dual compartments, and positive and negative elements in each of the compartments, the negative element of one compartment and the positive element of the other compartment being rigidly and electrically connected, substantially as described.

8. A storage battery unit comprising conducting containing means having provision for forming dual non-communicating compartments, and positive and negative elements in each of the compartments, the negative element of one compartment and the positive element of the other compartment being rigidly and electrically connected, substantially as described.

9. A storage battery unit comprising dual cell compartments, the walls of which are of conducting material and are exposed but inactive to the electrolyte, and positive and negative elements in each of the compartments so connected that the voltage of such unit is substantially twice the voltage obtainable from the elements in one of the cell compartments, substantially as described.

This specification signed and witnessed this 1st day of August, 1917.

HEINRICH H. MENO KAMMERHOFF.

Witnesses:
WILLIAM A. HARDY,
JESSIE E. STALKER.

Correction in Letters Patent No. 1,255,536.

It is hereby certified that in Letters Patent No. 1,255,536, granted February 5, 1918, upon the application of Heinrich H. Meno Kammerhoff, of Orange, New Jersey, for an improvement in "Galvanic Batteries," an error appears in the printed specification requiring correction as follows: Page 3, line 6, claim 5, for the word "relatively" read *respectively;* and that the said Letters Patent should be read with this correction therein that the same may conform to the record of the case in the Patent Office.

Signed and sealed this 23d day of July, A. D., 1918.

[SEAL.]

R. F. WHITEHEAD,
*Acting Commissioner of Patents.*

Cl. 204—29.